April 7, 1942.   K. BRATRING   2,278,609
METHOD OF PRODUCING WATERPROOF FILMS AND HOLLOW BODIES
Filed Nov. 18, 1937
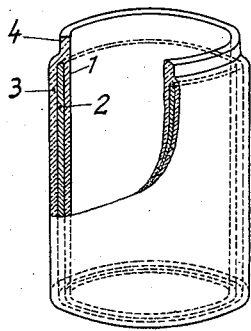
Inventor
Kurt Bratring,
By Watson E. Coleman,
Atty.

Patented Apr. 7, 1942

2,278,609

UNITED STATES PATENT OFFICE 2,278,609

METHOD OF PRODUCING WATERPROOF FILMS AND HOLLOW BODIES

Kurt Bratring, Dahlem, Berlin, Germany, assignor, by mesne assignments, to Neocell Products Corporation, a corporation of Delaware Application November 18, 1937, Serial No. 175,347 In Germany November 30, 1936

3 Claims. (Cl. 229—3.5)

This invention relates to a method of producing waterproof hollow bodies from cellulose esters and ethers.

It has already been proposed for photographic and electrical purposes to produce layers or films from cellulose derivatives, which are not waterproof in themselves, and to furnish the same with a waterproof coating consisting, for example, of a varnish or of rubber. These known films, however, are suitable only for certain specific purposes, and cannot be used, for example, for packing liquid or semi-liquid substances, and more particularly foodstuffs. On the other hand there is undoubtedly an urgent demand for suitable containers, or materials for such containers, adapted to replace the heavy, expensive and fragile glass containers usually employed for these substances at the present time.

It is, therefore, the object of the invention to devise a simple and economic method by which this result can be accomplished, and with this object in view the invention accordingly comprises a method of producing waterproof hollow bodies, which consists in first producing a layer composed of a cellulose derivative, then applying to the first layer a second layer consisting of a waterproofing substance, and finally applying to the second layer a third layer consisting of a cellulose derivative.

The first and the third layers may consist, for example, of acetyl cellulose or nitrocellulose, and the second layer may be a solution of caoutchouc or the like in an organic solvent. Plasticizing agents may be incorporated as desired either in the cellulose layers or in either of them or in the waterproof layer, or in both.

If desired, there may be employed a solvent common to both the cellulose layers as well as the waterproof layer. Thus, for example, methylene chloride having an addition of ethyl alcohol or cyclohexanone is a solvent which dissolves both acetyl cellulose as well as caoutchouc. Accordingly when using this solvent its recovery is rendered more simple. Moreover, the addition of a resin to the caoutchouc can then be wholly or partially dispensed with.

To increase the powers of adhesion of the caoutchouc layer, with or without an addition of resin, there may be added thereto a plasticizing agent, such as butyl stearate.

In the production of a hollow body, such as a tube, there is employed a mould or core, which is introduced first into a solution of, say, nitrocellulose and a plasticizing agent or agents in acetone and then into a solution of caoutchouc in benzol—in this case an addition of resin can be dispensed with—and finally into a solution of acetyl cellulose and a plasticizing agent or agents in acetone. In place of acetyl cellulose the surface layer may consist of nitrocellulose dissolved in acetone.

A tubular body produced in accordance with this method is shown in the drawing in a perspective view and partly in section. The inner layer 1 is first produced by immersion of a suitable core in a liquid as has been described. The second layer 2 and the outer layer 3 are subsequently deposited on the first layer 1. 4 designates where the inner layer 1 and the outer layer 3 merge into one practically integral wall.

If upon the immersion in the caoutchouc solution care is taken that the uppermost portion of the tube remains uncovered, the inner layer of nitrocellulose will enter at this point into immediate contact with the outer layer of acetyl cellulose or nitrocellulose, a firm adhesion of these two layers then being ensured.

In the production of hollow bodies three layers as described may be found to be insufficient. In this case, therefore, there is again applied to the third layer an additional layer of caoutchouc or the like, and over the latter a further layer of cellulose material, this process being continued until the desired thickness has been attained. Naturally the outer layer will always be a cellulose derivative layer.

In place of cellulose esters there may also be employed cellulose ethers, and in place of caoutchouc solutions there may be employed solutions of gutta percha, balata or synthetic resins alone, for example the products derived from anhydrous phthalic acid and glycerine, synthetic polyvinyl esters or the like.

What I claim as new and desire to secure by Letters Patent is:

1. A moisture-proof container composed of a plurality of layers of a cellulose derivative and a layer of a moisture-proof material positioned between said cellulosic layers and bonded thereto, all of said layers being so shaped as to provide a seamless container having a bottom and upstanding sidewalls, the layers of cellulosic material extending out beyond the moisture-proof layer and being bonded directly to each other to form a substantially homogeneous rim at the open end of said container, said rim being thinner than the remainder of said side walls by the thickness of said layer of moisture-proof material.

2. A moisture-proof container composed of a plurality of layers of nitrocellulose and a layer of moisture-proof material positioned between said nitrocellulose layers and bonded thereto, all of said layers being so shaped as to provide a seamless container having a bottom and upstanding sidewalls, the layers of nitrocellulose extending out beyond the moisture-proof layer and being bonded directly to each other to form a substantially homogeneous rim at the open end of said container, said rim being thinner than the remainder of said side walls by the thickness of said layer of moisture-proof material.

3. A moisture-proof container composed of a plurality of layers of nitrocellulose and a layer of a rubber material positioned between said nitrocellulose layers and bonded thereto, all of said layers being so shaped as to provide a seamless container having a bottom and upstanding sidewalls, the layers of nitrocellulose extending out beyond the rubber layer and being bonded directly to each other to form a substantially homogeneous rim at the open end of said container, said rim being thinner than the remainder of said side walls by the thickness of said layer of moisture-proof material.

KURT BRATRING.